United States Patent
Fu

(10) Patent No.: US 9,542,034 B2
(45) Date of Patent: Jan. 10, 2017

(54) DISPLAY PANEL HAVING TOUCH DETECTION FUNCTION AND CONTROL METHOD FOR THE SAME

(71) Applicant: Shenzhen China Star Optoelectronics Technology Co., Ltd., Shenzhen, Guangdong (CN)

(72) Inventor: Ruhai Fu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 97 days.

(21) Appl. No.: 14/433,631

(22) PCT Filed: Dec. 30, 2014

(86) PCT No.: PCT/CN2014/095583
§ 371 (c)(1),
(2) Date: Apr. 3, 2015

(87) PCT Pub. No.: WO2016/101312
PCT Pub. Date: Jun. 30, 2016

(65) Prior Publication Data
US 2016/0188075 A1    Jun. 30, 2016

(30) Foreign Application Priority Data
Dec. 24, 2014 (CN) .......................... 2014 1 0817969

(51) Int. Cl.
G06F 3/044 (2006.01)
G06F 3/041 (2006.01)
G09G 3/36 (2006.01)

(52) U.S. Cl.
CPC ............. *G06F 3/0416* (2013.01); *G06F 3/044* (2013.01); *G06F 3/0412* (2013.01);
(Continued)

(58) Field of Classification Search
CPC ...... G06F 3/044; G06F 3/0416; G06F 3/0412; G09G 3/36; G09G 3/3659; G09G 3/3677; G09G 3/3688
(Continued)

(56) References Cited

U.S. PATENT DOCUMENTS 9,218,085 B2 * 12/2015 Hwang ................ G06F 3/0412
9,298,307 B2 *  3/2016 Chen .................... G06F 3/0416
(Continued)

*Primary Examiner* — Vijay Shankar
(74) *Attorney, Agent, or Firm* — Andrew C. Cheng

(57) ABSTRACT

A display panel having a touch detection function and a control method. The display panel includes a display element and a touch element. The touch element includes a touch scanning chip, a scanning selector connected with the touch scanning chip, and multiple touch electrodes connected with the scanning selector. Wherein, the touch scanning chip outputs a selection signal to the scanning selector in order to selectively connect the multiple touch electrodes to the touch scanning chip such that the touch scanning chip sequentially performs a touch scanning operation; the number of ports of the scanning selector used for connecting the touch electrodes is greater the number of ports used for connecting the touch electrodes to the touch scanning chip. The number of lead wires is reduced to reduce the manufacturing process. A higher touch sampling frequency is realized and a better touch effect is obtained.

16 Claims, 3 Drawing Sheets

(52) U.S. Cl.
CPC ......... *G09G 3/3659* (2013.01); *G09G 3/3677* (2013.01); *G09G 3/3688* (2013.01); *G06F 2203/04103* (2013.01); *G06F 2203/04104* (2013.01); *G06F 2203/04112* (2013.01); *G09G 2300/0809* (2013.01); *G09G 2310/067* (2013.01); *G09G 2320/0252* (2013.01); *G09G 2340/16* (2013.01)

(58) Field of Classification Search
USPC .................................................. 345/173–178
See application file for complete search history.

(56) References Cited

U.S. PATENT DOCUMENTS

| | | | |
|---|---|---|---|
| 2014/0062918 A1* | 3/2014 | Chen .................... | G06F 3/0416 345/173 |
| 2014/0139459 A1* | 5/2014 | Wu ....................... | G06F 3/0416 345/173 |
| 2014/0240279 A1* | 8/2014 | Hwang .................. | G06F 3/044 345/174 |

* cited by examiner

DISPLAY PANEL HAVING TOUCH DETECTION FUNCTION AND CONTROL METHOD FOR THE SAME

BACKGROUND OF THE INVENTION

1. Field of the Invention

The present invention relates to a liquid crystal display, and more particularly to a display panel having a touch detection function and a control method for the same.

2. Description of Related Art

Currently, in an embedded self-capacitance multi-touch technology, electrodes are disposed between an upper glass substrate and a lower glass substrate of a display screen. The electrodes are full of the entire surface of the display screen. Each of the electrodes can be made of any conductive material and any conductive layer. The self-capacitance only require single touch electrode. Through a capacitor formed between the touch electrode and touch object, a touch event is determined. Besides, through capacitances measured by adjacent touch electrodes, a touch position is obtained by a weight calculation. As shown in FIG. 1, all of the touch electrodes 11 are respectively led out to a touch scanning chip 12. Each of the touch electrodes connects with the touch scanning chip 12 through a lead wire 13. The touch scanning chip 12 independently scans all of the touch electrodes 11 in order to determine a touch event. For example, in a 6-inch display screen, when specification of a touch resolution is 24*13, the number of the lead wires 13 is 312 lines, which is not suitable for mass production.

SUMMARY OF THE INVENTION

The technology problem solved by the present invention is to provide a display panel having a touch detection function and a control method for the same, which can reduce the number of the lead wires, the manufacturing process, and realize a higher touch sampling frequency and a better touch effect.

In order to solve the technology problem, a technology solution adopted by the present invention is: a display panel having a touch detection function, comprising: a display element; and a touch element including a touch scanning chip; a scanning selector connected with the touch scanning chip; and multiple touch electrodes connected with the scanning selector; wherein, the touch scanning chip outputs a selection signal to the scanning selector in order to selectively connect the multiple touch electrodes to the touch scanning chip such that the touch scanning chip sequentially performs a touch scanning operation; the number of ports of the scanning selector used for connecting the touch electrodes is greater the number of ports used for connecting the touch electrodes to the touch scanning chip.

Wherein, the scanning selector includes multiple switching elements; the selection signal controls the switching elements to be selectively turned on or turned off in order to selectively connect the touch electrodes to the touch scanning chip.

Wherein, the display element includes multiple gate lines disposed in parallel and a gate driver; the gate driver sequentially performs a gate scanning operation to the gate lines, wherein, a time interval is disposed between adjacent gate scanning operations, and the touch scanning chip performs the touch scanning operation in the time interval.

Wherein, the display element further includes multiple data lines which are insulated and across with the gate lines and a data driver; the gate lines and the data lines define multiple pixel areas arranged as a matrix; the display element further includes a Thin-Film Transistor (TFT) and a pixel electrode which are disposed in each pixel area; wherein, a gate electrode of the TFT connects with a corresponding gate line of the gate lines; a source electrode of the TFT connects with a corresponding data line of the data lines; a drain electrode of the TFT connects with the pixel electrode.

Wherein, the display element further includes a common electrode; the common electrode is disposed oppositely to the pixel electrodes; the multiple touch electrodes are formed by dividing the common electrodes.

Wherein, each of the touch electrodes is a rectangle and the touch electrodes are arranged as a matrix; the touch element further includes lead wires and the number of the lead wires is equal to the number of the touch electrodes, wherein, the lead wires and the touch electrodes are disposed at different layers.

Wherein, the number of the touch electrodes is smaller than the number of the gate lines such that the touch scanning chip performs at least two touch detection operations to each touch electrode in one display frame.

Wherein, the number of gate lines is an integer multiple of the number of the touch electrodes.

In order to solve the technology problem, another technology solution adopted by the present invention is: a control method for a display panel having a touch detection function, wherein, the display panel includes a display element and a touch element; the touch element includes a touch scanning chip, a scanning selector connected with the touch scanning chip, and multiple touch electrodes connected with the scanning selector; and the control method comprises: outputting a selection signal to the scanning selector by the touch scanning chip in order to selectively connect the touch electrodes to the touch scanning chip; and sequentially performing a touch scanning operation to the multiple touch electrodes by the touch scanning chip.

Wherein, the display element includes multiple gate lines disposed in parallel and a gate driver; the gate driver sequentially performs a gate scanning operation to the gate lines, wherein, a time interval is disposed between two adjacent gate scanning operations, and in the time interval, the touch scanning chip performs the touch scanning operation to the touch electrodes connected with the touch scanning chip.

The beneficial effects of the present invention are: comparing to the conventional art, the display panel of the present invention includes a display element and a touch element. Wherein, the touch element includes a touch scanning chip, a scanning selector connected with the touch scanning chip, and multiple touch electrodes connected with the scanning selector. Wherein, the touch scanning chip outputs a selection signal to the scanning selector in order to selectively connect the multiple touch electrodes to the touch scanning chip such that the touch scanning chip sequentially performs a touch scanning operation; the number of ports of the scanning selector used for connecting the touch electrodes is greater the number of ports used for connecting the touch electrodes to the touch scanning chip. As a result, the number of lead wires is greatly reduced in order to reduce the manufacturing process. A higher touch sampling frequency is realized and a better touch effect is obtained.

DETAILED DESCRIPTION OF THE PREFERRED EMBODIMENT

The following will combine drawings and embodiments for detailed description of the present invention.

Figure 1:
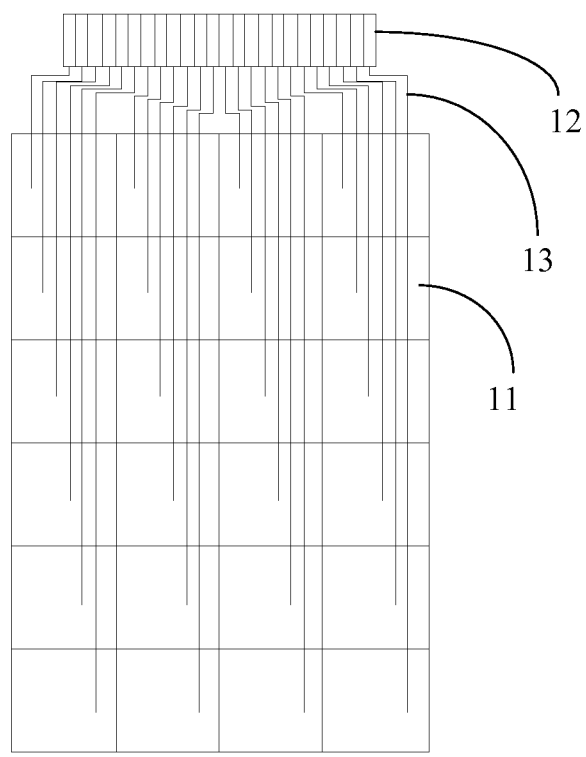
FIG. 1 is a schematic diagram of a display panel having a touch detection function according to the conventional art.
Figure 2:
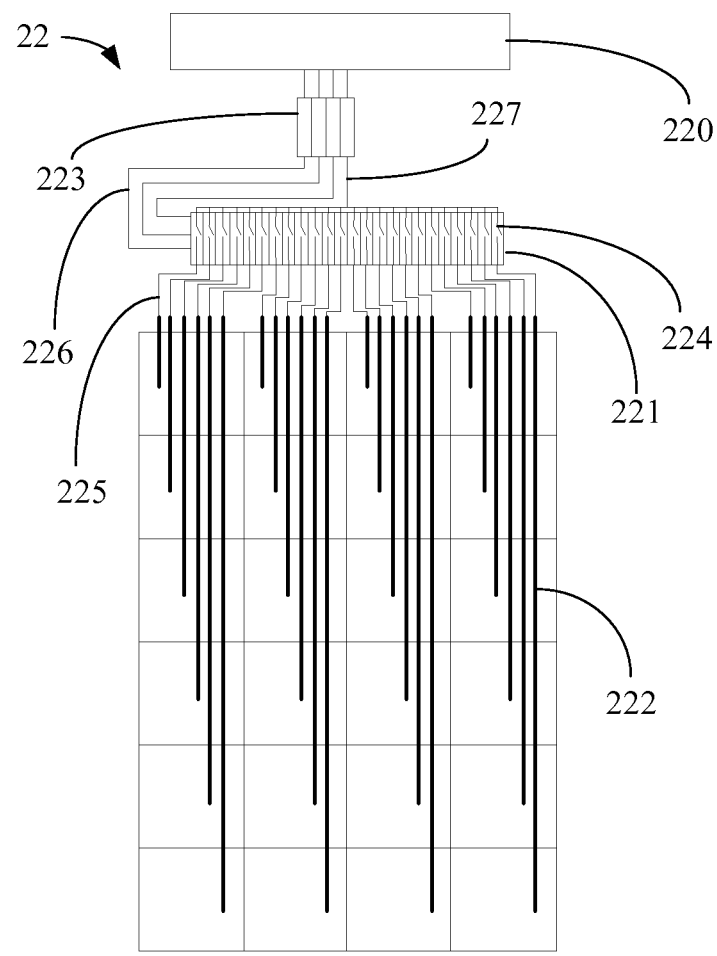
FIG. 2 is a schematic diagram of a touch element of a display panel having a touch detection function according to an embodiment of the present invention.
Figure 3:
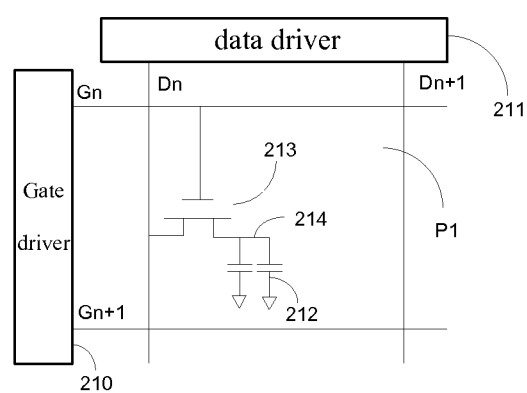
FIG. 3 is a schematic diagram of a display element of a display panel having a touch detection function according to an embodiment of the present invention.

With reference to FIG. 2 and FIG. 3, wherein, FIG. 2 is a schematic diagram of a touch element of a display panel having a touch detection function according to an embodiment of the present invention. As shown in FIG. 2 and FIG. 3, the display panel having a touch detection function includes a display element 21 and a touch element 22. The touch element 22 includes a touch scanning chip 220, a scanning selector 221, and multiple touch electrodes 222. The multiple touch electrodes 222 are connected with the scanning selector 221. The scanning selector 221 is connected with the touch scanning chip 220. The touch scanning chip 220 outputs a selection signal 223 to the scanning selector 221 in order to selectively connect the multiple touch electrodes 222 to the touch scanning chip 220 such that the touch scanning chip 220 sequentially performs a touch scanning operation to the multiple touch electrodes 222. Wherein, the number of ports of scanning selector 221 used for connecting the multiple touch electrodes 222 is greater than the number of ports used for connecting the multiple touch electrodes 222 to the touch scanning chip 220.

The scanning selector 221 includes multiple switching elements 224, the selection signal 223 controls the switching elements 224 to be selectively turned on or turned off. Therefore, the touch electrodes 222 are selectively connected to the touch scanning chip 220. Each of the touch electrodes 222 is disposed as a rectangle, and the touch electrodes 222 are arranged as a matrix. The touch element 22 further includes multiple lead wires 225 such that the number of the multiple lead wires 225 is the same as the number of the touch electrodes 222. Each of the touch electrodes 222 is connected with the scanning selector 221 through a corresponding lead wire 225.

FIG. 3 is a schematic diagram of a display element of a display panel having a touch detection function according to an embodiment of the present invention. As shown in FIG. 3, the display element includes multiple gate lines Gn, Gn+1 disposed in parallel, a gate driver 210, multiple data lines Dn, Dn+1 which are insulated and across with the gate lines Gn, Gn+1, and a data driver 211. The multiple gate lines Gn, Gn+1 and the multiple data lines Dn, Dn+1 define multiple pixel areas P1 which are arranged as a matrix.

The display element 21 further includes a common electrode 212, and a Thin-Film Transistor (TFT) 213 and a pixel electrode 214 which are disposed in each pixel area P1. The common electrode 212 and the pixel electrode 214 are disposed oppositely. A gate electrode of the TFT 213 connects with a corresponding Gn. A source electrode of the TFT 213 connects with a corresponding Dn. A drain electrode of the TFT 213 connects with the pixel electrode 214. The gate driver 210 sequentially performs gate scanning operations on the gate lines Gn, Gn+1. Wherein, a time interval is disposed between two adjacent gate scanning operations, and the touch scanning chip 220 performs a touch scanning operation in the time interval.

In the embodiment of the present invention, the multiple touch electrodes 222 are formed by dividing the common electrode 212. Specifically, the multiple touch electrodes 222 can be realized by directly utilizing the common electrode 212 of the display element 21. Besides, the touch electrodes can also be obtained by other methods such as utilizing a metal layer or an ITO layer of a color filter substrate to manufacture the common electrode to function as the touch electrode. The lead wires 225 and the touch electrodes 222 are disposed in different layers. For example, the lead wires 225 can be disposed at a black matrix area of the display panel in order to avoid decreasing the aperture ratio.

In the embodiment of the present invention, through time division driving to respectively drive the display element 21 and the touch element 22. The touch scanning chip 220 outputs the selection signal 223. The selection signal 223 includes a control signal 226 and a scanning signal 227. The selection signal 223 coordinates an operation timing of the touch element 22 and the display element 21. Through the control signal 226 to select an input channel for the scanning signal 227, that is, to select a touch electrode for inputting.

Specifically, the control signal 226 controls the switching element 224 of the scanning selector 221 to respectively turn on and turn off the switching elements 224 in order to realize a signal transmission channel having a bi-directional conduction function, that is, the scanning signal is transmitted to the touch electrode through the lead wire 225 or a touch signal is sensed for performing a weight calculation in order to obtain a precise position of a touch event.

Wherein, the number of ports of the scanning selector 221 used for connecting the touch electrodes is equal to the number of the touch electrodes 222, that is, the number of the lead wires 225. The number of ports used for connecting the touch electrodes 222 to the touch scanning chip 220 is equal to the number of the selection signals 223 outputted by the touch scanning chip 220. As shown in FIG. 2, the number of the lead wires 225 is greater than the number of the selection signals 223. Therefore, the number of the ports of the scanning selector 221 used for connecting the touch electrodes is greater than the number of the ports used for connecting the touch electrodes 222 to the touch scanning chip 220. As a result, the number of lead wires is greatly reduced in order to reduce the manufacturing process. For example, for a 6-inch screen, the number of the ports used for connecting the touch electrodes 222 to the touch scanning chip 220 is reduced from more than 300 pins to within 20 pins.

Figure 4:
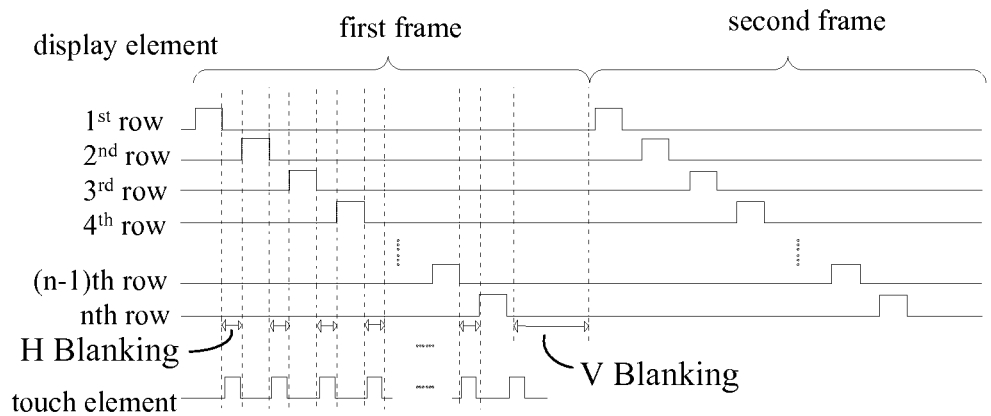
FIG. 4 is a timing diagram of the touch element and the display element according to an embodiment of the present invention.

The timing diagram of the touch element 22 and the display element 21 is shown in FIG. 4. The last timing sequence of FIG. 4 represents the driving signal of the touch element 22. The other timing sequences represent the gate driving signals for each row of the display element 21. A time interval between gate driving signals of one row and a next row of the display element 21 is call an H Blanking time. A time interval between a first frame and a second frame of the display element 21 is called V Blanking time. In the H Blanking time and the V Blanking time, each of the gate lines and data lines does not transmit a signal. Assume that row driving signals of the gate electrodes of the display element 21 have n rows, n time intervals can be obtained, which includes time intervals of H Blanking and V Blanking. The scanning operations of the touch element 22 can be arranged in the n time intervals.

In the embodiment of the present invention, the number of the touch electrodes 222 is less than the number of the gate lines Gn, Gn+1. The number of the gate lines Gn, Gn+1 is an integer multiple of the number of the touch electrodes such that the touch scanning chip 220 can perform twice touch detection operations to each touch electrode 222 in each frame. For example, the number of the touch electrodes divided by the common electrode of the display element 21 is m, and respectively scans and collects the touch data for m touch electrodes in n H Blanking times in a display time of one frame. If in the display time of one frame, respectively scanning the m touch electrodes once, a touch sampling frequency is equal to the display refresh frequency, that is, 60 Hz. If in the display time of one frame, respectively scanning the m touch electrodes twice, a touch sampling frequency is equal to twice of the display refresh frequency, that is, 120 Hz. The touch sampling frequency can be adjusted freely so as to realize higher touch sampling frequency and obtain a better touch effect.

Figure 5:
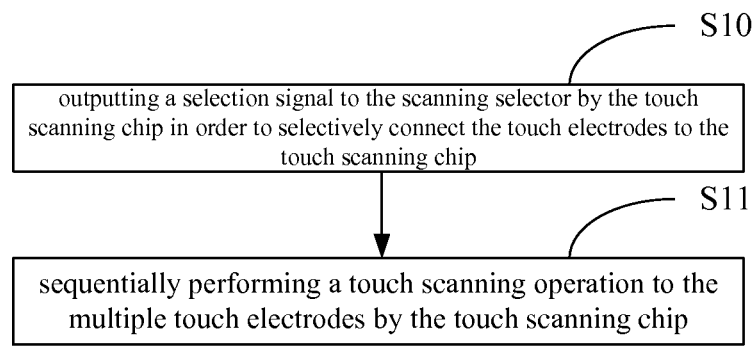
FIG. 5 is a flow chart of a control method for a display panel having a touch detection function according to an embodiment of the present invention.

FIG. 5 is a flow chart of a control method for a display panel having a touch detection function according to an embodiment of the present invention. The display panel includes a display element and a touch element. Wherein, the touch element includes a touch scanning chip, a scanning selector connected with the touch scanning chip, and multiple touch electrodes connected with the scanning selector. As shown in FIG. 5, the control method for the display panel having a touch detection function comprises:

Step S10: outputting a selection signal to the scanning selector by the touch scanning chip in order to selectively connect the touch electrodes to the touch scanning chip.

In the step S10, the scanning selector includes multiple switching elements, the selection signal controls the switching elements to be selectively turned on or turned off. Therefore, the touch electrodes are selectively connected with the touch scanning chip. Each of the touch electrodes is disposed as a rectangle, and the touch electrodes are arranged as a matrix. The touch element further includes multiple lead wires such that the number of the multiple lead wires is the same as the number of the touch electrodes. Each of the touch electrodes is connected with the scanning selector through a corresponding lead wire.

The display element includes multiple gate lines disposed in parallel, a gate driver, multiple data lines which are insulated and across with the gate lines, and a data driver. The multiple gate lines and the multiple data lines define multiple pixel areas which are arranged as a matrix.

The display element further includes a common electrode, and a TFT and a pixel electrode which are disposed in each pixel area. The common electrode and the pixel electrode are disposed oppositely. A gate electrode of the TFT connects with a corresponding gate line. A source electrode of the TFT connects with a corresponding data line. A drain electrode of the TFT connects with the pixel electrode. The gate driver sequentially performs gate scanning operations on the gate lines.

The multiple touch electrodes are formed by dividing the common electrode. Specifically, the multiple touch electrodes can be realized by directly utilizing the common electrode of the display element. Besides, the touch electrodes can also be obtained by other methods such as utilizing a metal layer or an ITO layer of a color filter substrate to manufacture the common electrode to function as the touch electrode.

The lead wires 225 and the touch electrodes 222 are disposed in different layers. For example, the lead wires 225 can be disposed at a black matrix area of the display panel in order to avoid decreasing the aperture ratio. The number of ports of the scanning selector used for connecting the touch electrodes is equal to the number of the touch electrodes, that is, the number of the lead wires. The number of ports used for connecting the touch electrodes to the touch scanning chip is equal to the number of the selection signals outputted by the touch scanning chip. The number of the lead wires is greater than the number of the selection signals. Therefore, the number of the ports of the scanning selector used for connecting the touch electrodes is greater than the number of the ports used for connecting the touch electrodes to the touch scanning chip. As a result, the number of lead wires is greatly reduced in order to reduce the manufacturing process. For example, for a 6-inch screen, the number of the ports used for connecting the touch electrodes to the touch scanning chip is reduced from more than 300 pins to within 20 pins.

Step S11: sequentially performing a touch scanning operation to the multiple touch electrodes by the touch scanning chip.

In the display element, a time interval is disposed between two adjacent gate scanning operations. In the time interval, the touch scanning chip performs the touch scanning operation to the touch electrodes connected with the touch scanning chip. In the present embodiment, a time interval between gate driving signals of one row and a next row of the display element is call an H Blanking time. A time interval between a first frame and a second frame of the display element 21 is called a V Blanking time. In the H Blanking time and the V Blanking time, each of the gate lines and data lines does not transmit a signal. Assume that row driving signals of the gate electrodes of the display element 21 have n rows, n time intervals can be obtained, which includes the H Blanking and the V Blanking time. The scanning operations of the touch element 22 can be arranged in the n time intervals.

In the embodiment of the present invention, the number of the touch electrodes is less than the number of the gate lines. The number of the gate lines is an integer multiple of the number of the touch electrodes such that the touch scanning chip can perform twice touch detection operations to each touch electrode in each frame. For example, the number of the touch electrodes divided by the common electrode of the display element is m, and respectively scans and collects the touch data form touch electrodes inn H Blanking times in a display time of one frame. If in the display time of one frame, respectively scanning the m touch electrodes once, a touch sampling frequency is equal to the display refresh frequency, that is, 60 Hz. If in the display time of one frame, respectively scanning the m touch electrodes twice, a touch sampling frequency is equal to twice of the display refresh frequency, that is, 120 Hz. The touch sampling frequency can be adjusted freely so as to realize higher touch sampling frequency and obtain a better touch effect.

In summary, the display panel of the present invention includes a display element and a touch element. Wherein, the touch element includes a touch scanning chip, a scanning selector connected with the touch scanning chip, and multiple touch electrodes connected with the scanning selector. Wherein, the touch scanning chip outputs a selection signal to the scanning selector in order to selectively connect the multiple touch electrodes to the touch scanning chip such that the touch scanning chip sequentially performs a touch scanning operation; the number of ports of the scanning selector used for connecting the touch electrodes is greater the number of ports used for connecting the touch electrodes to the touch scanning chip. As a result, the number of lead wires is greatly reduced in order to reduce the manufacturing process. A higher touch sampling frequency is realized and a better touch effect is obtained.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display panel having a touch detection function, comprising:
   a display element; and
   a touch element, including:
      a touch scanning chip;
      a scanning selector connected with the touch scanning chip, and disposed outside the touch scanning chip; and
      multiple touch electrodes connected with the scanning selector;
   wherein, the touch scanning chip outputs a selection signal including a control signal and a scanning signal to the scanning selector in order to selectively connect the multiple touch electrodes to the touch scanning chip such that the touch scanning chip sequentially performs a touch scanning operation; the number of ports of the scanning selector used for connecting the touch electrodes is greater the number of ports used for connecting the touch electrodes to the touch scanning chip;
   wherein, the scanning selector includes multiple switching elements; the control signal of the selection signal outputted by the touch scanning chip directly controls the switching elements of the scanning selector to be selectively turned on or turned off in order to selectively connect the multiple touch electrodes to the touch scanning chip in order to input the scanning signal of the selection signal into the multiple touch electrodes; the display element includes multiple gate lines disposed in parallel and a gate driver; in a display time of one frame, the gate driver sequentially performs a gate scanning operation to the gate lines, wherein, a time interval is disposed between two adjacent gate scanning operations, and the touch scanning chip performs the touch scanning operation in the time interval.

2. The display panel according to claim 1, wherein, the display element further includes multiple data lines which are insulated and across with the gate lines and a data driver; the gate lines and the data lines define multiple pixel areas arranged as a matrix; the display element further includes a Thin-Film Transistor (TFT) and a pixel electrode which are disposed in each pixel area; wherein, a gate electrode of the TFT connects with a corresponding gate line of the gate lines; a source electrode of the TFT connects with a corresponding data line of the data lines; a drain electrode of the TFT connects with the pixel electrode.

3. The display panel according to claim 2, wherein, the display element further includes a common electrode; the common electrode is disposed oppositely to the pixel electrodes; the multiple touch electrodes are formed by dividing the common electrodes.

4. The display panel according to claim 2, wherein, each of the touch electrodes is a rectangle and the touch electrodes are arranged as a matrix; the touch element further includes lead wires and the number of the lead wires is equal to the number of the touch electrodes, wherein, the lead wires and the touch electrodes are disposed at different layers.

5. The display panel according to claim 3, wherein, the number of the touch electrodes is smaller than the number of the gate lines such that the touch scanning chip performs at least two touch detection operations to each touch electrode in one display frame.

6. The display panel according to claim 5, the number of gate lines is an integer multiple of the number of the touch electrodes.

7. A display panel having a touch detection function, comprising:
   a display element; and
   a touch element, including:
      a touch scanning chip;
      a scanning selector connected with the touch scanning chip, and disposed outside the touch scanning chip; and
      multiple touch electrodes connected with the scanning selector;
   wherein, the touch scanning chip outputs a selection signal including a control signal and a scanning signal to the scanning selector in order to selectively connect the multiple touch electrodes to the touch scanning chip such that the touch scanning chip sequentially performs a touch scanning operation; the number of ports of the scanning selector used for connecting the touch electrodes is greater the number of ports used for connecting the touch electrodes to the touch scanning chip.

8. The display panel according to claim 7, wherein, the scanning selector includes multiple switching elements; the control signal of the selection signal outputted by the touch scanning chip directly controls the switching elements of the scanning selector to be selectively turned on or turned off in order to selectively connect the multiple touch electrodes to the touch scanning chip in order to input the scanning signal of the selection signal into the multiple touch electrodes.

9. The display panel according to claim 7, wherein, the display element includes multiple gate lines disposed in parallel and a gate driver; the gate driver sequentially performs a gate scanning operation to the gate lines, wherein, a time interval is disposed between adjacent gate scanning operations, and the touch scanning chip performs the touch scanning operation in the time interval.

10. The display panel according to claim 9, wherein, the display element further includes multiple data lines which are insulated and across with the gate lines and a data driver; the gate lines and the data lines define multiple pixel areas arranged as a matrix; the display element further includes a Thin-Film Transistor (TFT) and a pixel electrode which are disposed in each pixel area; wherein, a gate electrode of the TFT connects with a corresponding gate line of the gate lines; a source electrode of the TFT connects with a corresponding data line of the data lines; a drain electrode of the TFT connects with the pixel electrode.

11. The display panel according to claim 10, wherein, the display element further includes a common electrode; the common electrode is disposed oppositely to the pixel electrodes; the multiple touch electrodes are formed by dividing the common electrodes.

12. The display panel according to claim 10, wherein, each of the touch electrodes is a rectangle and the touch electrodes are arranged as a matrix; the touch element further includes lead wires and the number of the lead wires is equal to the number of the touch electrodes, wherein, the lead wires and the touch electrodes are disposed at different layers.

13. The display panel according to claim 11, wherein, the number of the touch electrodes is smaller than the number of the gate lines such that the touch scanning chip performs at least two touch detection operations to each touch electrode in one display frame.

14. The display panel according to claim 13, wherein, the number of gate lines is an integer multiple of the number of the touch electrodes.

15. A control method for a display panel having a touch detection function, wherein, the display panel includes a display element and a touch element; the touch element includes a touch scanning chip, a scanning selector connected with the touch scanning chip, and multiple touch electrodes connected with the scanning selector; and the control method comprises:

outputting a selection signal including a control signal and a scanning signal to the scanning selector by the touch scanning chip in order to selectively connect the multiple touch electrodes to the touch scanning chip; and sequentially performing a touch scanning operation to the multiple touch electrodes by the touch scanning chip.

16. The control method according to claim 15, wherein, the display element includes multiple gate lines disposed in parallel and a gate driver; in a display time of one frame, the gate driver sequentially performs a gate scanning operation to the gate lines, wherein, a time interval is disposed between two adjacent gate scanning operations, and in the time interval, the touch scanning chip performs the touch scanning operation to the multiple touch electrodes connected with the touch scanning chip by inputting the scanning signal of the selection signal into the multiple touch electrodes.

* * * * *